United States Patent
Omar et al.

(10) Patent No.: US 12,475,597 B2
(45) Date of Patent: Nov. 18, 2025

(54) ROBUST LIDAR-TO-CAMERA SENSOR ALIGNMENT

(71) Applicant: GM GLOBAL TECHNOLOGY OPERATIONS LLC, Detroit, MI (US)

(72) Inventors: Yousef A. Omar, Troy, MI (US); Hao Yu, Troy, MI (US); Wende Zhang, Birmingham, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 400 days.

(21) Appl. No.: 18/183,406

(22) Filed: Mar. 14, 2023

(65) Prior Publication Data
US 2024/0312058 A1    Sep. 19, 2024

(51) Int. Cl.
| | |
|---|---|
| G06T 7/80 | (2017.01) |
| G01S 17/89 | (2020.01) |
| G06T 7/13 | (2017.01) |
| G06T 7/50 | (2017.01) |
| G06T 7/70 | (2017.01) |

(52) U.S. Cl.
CPC ........... *G06T 7/80* (2017.01); *G01S 17/89* (2013.01); *G06T 7/13* (2017.01); *G06T 7/50* (2017.01); *G06T 7/70* (2017.01); *G06T 2207/10028* (2013.01); *G06T 2207/20084* (2013.01); *G06T 2207/30252* (2013.01)

(58) Field of Classification Search
CPC .... G06T 7/80; G06T 7/13; G06T 7/50; G06T 7/70; G06T 2207/10028; G06T 2207/20084; G06T 2207/30252; G06T 7/73; G01S 17/89; G01S 17/86; G01S 17/931; G01S 7/4972; B60W 50/00; B60W 2050/0043
USPC ........................................................ 382/100
See application file for complete search history.

(56) References Cited

U.S. PATENT DOCUMENTS

| | | | |
|---|---|---|---|
| 2021/0004610 A1* | 1/2021 | Huang | ................ G01S 17/10 |
| 2023/0274462 A1* | 8/2023 | Petrov | .................. G06T 7/13 |
| | | | 348/180 |
| 2023/0406301 A1* | 12/2023 | Parks | ................ B60W 30/12 |

* cited by examiner

*Primary Examiner* — Jerome Grant, II
(74) *Attorney, Agent, or Firm* — Ingrassia Fisher & Lorenz, LLP | IF&L

(57) ABSTRACT

A sensor alignment method including detecting, detecting an object within a first sensor field of view and a second sensor field of view, detecting a plurality of depth point clouds of the first field of view in response to the object being stationary, the host vehicle being stationary, and the distance between the object and the host vehicle being less than a threshold distance, aggregating the plurality of depth point clouds into an aggregated depth point cloud, detecting a first location of an edge of the object in response to the aggregated depth point cloud, detecting a second location of the edge of the object using an edge detection algorithm on the image, generating a lidar to camera alignment in response to a difference between the first location and the second location.

20 Claims, 5 Drawing Sheets

ROBUST LIDAR-TO-CAMERA SENSOR ALIGNMENT

INTRODUCTION

The present disclosure generally relates to vehicle sensor alignment systems in a vehicle, and more particularly relates to a method and apparatus for lidar to camera alignment information for use in image processing in a vehicle.

Modern vehicles are increasingly being equipped with more and more electronics systems in order to enhance vehicle safety and performance. These electronic systems can include sensors for enabling a vehicle, such as autonomous and semi-autonomous vehicles, to sensor its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, autonomous vehicle features rely on sensor data to be accurately and precisely converted into real world coordinates for data association and sensor fusion. Many systems combine data from different sensors for more accurate predictions. In order to combine the data from different sensors, the sensors must be aligned through calibration parameters, referred to as extrinsic parameters. Accordingly, it is desirable to provide improved systems and methods for aligning sensors of a vehicle using estimated extrinsic parameters. Furthermore, other desirable features and characteristics of the present invention will become apparent from the subsequent detailed description and the appended claims, taken in conjunction with the accompanying drawings and the foregoing technical field and background.

SUMMARY

Vehicle sensor system calibration methods. A vehicle control system performing a vehicle control algorithm is operative to receive data from vehicle sensors, determine a stop from behind vehicle condition, generate sensor data in response to the stop from behind conditions being met and to process the data and extract features from the sensor pairs, lidar and camera, then we execute an iterative alignment procedure to estimate the alignment correction values and/or sensor alignment correction values. In accordance with an exemplary embodiment, the vehicle sensor system includes.

In accordance with an aspect of the exemplary embodiment, an apparatus including a lidar sensor having a first field of view for generating a point cloud representative of a plurality of depth detections over the first field of view, a camera having a second field of view for generating an image of the second field of view, a processor for detecting an object in response to the point cloud within the first field of view and the second field of view, determining a distance between the object and the host vehicle and a velocity of the object, detecting a plurality of depth point clouds of the first field of view in response to the object being stationary, the host vehicle being stationary, and the distance between the object and the host vehicle being less than a threshold distance, aggregating the plurality of depth point clouds into an aggregated depth point cloud, detecting a first location of an edge of the object in response to the aggregated depth point cloud, detecting a second location of the edge of the object using an edge detection algorithm on the image, generating a lidar to camera alignment in response to a difference between the first location and the second location, and a vehicle controller for controlling the host vehicle in response to the lidar to camera alignment and a subsequent image captured by the camera.

In accordance with another aspect of the exemplary embodiment, wherein the second field of view is narrower than the first field of view.

In accordance with another aspect of the exemplary embodiment, wherein the camera is a long range camera and wherein the second field of view is narrower than the first field of view.

In accordance with another aspect of the exemplary embodiment, detecting a subsequent object with in the first field of view and the second field of view, detecting a subsequent plurality of depth point clouds of the first field of view in response to the subsequent object being stationary, the host vehicle being stationary, and the distance between the subsequent object and the host vehicle being less than a threshold distance and refining the lidar to camera alignment in response to the subsequent plurality of depth point clouds.

In accordance with another aspect of the exemplary embodiment, wherein the threshold distance is 10 meters.

In accordance with another aspect of the exemplary embodiment, wherein the object is a proximate vehicle in front of the host vehicle.

In accordance with another aspect of the exemplary embodiment, wherein the plurality of depth point clouds include 20 lidar scans of the first field of view.

In accordance with another aspect of the exemplary embodiment, wherein the second location of the edge of the object is detected using at least one of an RCNN vehicle segmentation method and a Canny edge detection method.

In accordance with another aspect of the exemplary embodiment, wherein the first location of the edge is detected by applying a density-based spatial clustering of applications with noise clustering followed by a convex haul algorithm to the aggregated depth point cloud.

In accordance with another aspect of the exemplary embodiment, a method including detecting, by a lidar, a depth point cloud of a first field of view, capturing, by a camera, an image of a second field of view, detecting, by a vehicle controller, a speed of a host vehicle, detecting an object within the first field of view and the second field of view, determining a distance between the object and the host vehicle and a velocity of the object, detecting a plurality of depth point clouds of the first field of view in response to the object being stationary, the host vehicle being stationary, and the distance between the object and the host vehicle being less than a threshold distance, aggregating the plurality of depth point clouds into an aggregated depth point cloud, detecting a first location of an edge of the object in response to the aggregated depth point cloud, detecting a second location of the edge of the object using an edge detection algorithm on the image, generating a lidar to camera alignment in response to a difference between the first location and the second location, and controlling a vehicle in response to the lidar to camera alignment and a subsequent image captured by the camera.

In accordance with another aspect of the exemplary embodiment, wherein the second field of view is narrower than the first field of view.

In accordance with another aspect of the exemplary embodiment, wherein the camera is a forward view long range camera having a horizontal field of view less than thirty degrees.

In accordance with another aspect of the exemplary embodiment, wherein the threshold distance is ten meters.

In accordance with another aspect of the exemplary embodiment, wherein the object is a proximate vehicle in front of the host vehicle.

In accordance with another aspect of the exemplary embodiment, wherein the object is determined to be stationary with respect to the host vehicle.

In accordance with another aspect of the exemplary embodiment, wherein the plurality of depth point clouds includes at least twenty lidar scans of the first field of view.

In accordance with another aspect of the exemplary embodiment, wherein the second location of the edge of the object is detected using at least one of an RCNN segmentation method and a Canny edge detection method.

In accordance with another aspect of the exemplary embodiment, wherein the first location of the edge is detected by applying a density-based spatial blustering of applications with noise clustering followed by a convex haul algorithm to the aggregated depth point cloud.

In accordance with another aspect of the exemplary embodiment, a vehicle control system including a lidar sensor having a first field of view for generating a point cloud representative of a plurality of depth detections over the first field of view, a camera having a second field of view for generating an image of the second field of view, a processor for detecting an object in response to the point cloud within the first field of view and the second field of view, determining a distance between the object and the host vehicle and a velocity of the object, detecting a plurality of depth point clouds of the first field of view in response to the object being stationary, the host vehicle being stationary, and the distance between the object and the host vehicle being less than a threshold distance, aggregating the plurality of depth point clouds into an aggregated depth point cloud, detecting a first location of an edge of the object in response to the aggregated depth point cloud, detecting a second location of the edge of the object using an edge detection algorithm on the image, generating a lidar to camera alignment in response to a difference between the first location and the second location, and a vehicle controller for controlling the host vehicle in response to the lidar to camera alignment and a subsequent image captured by the camera.

In accordance with another aspect of the exemplary embodiment, wherein the second location of the edge of the object is detected using at least one of an RCNN segmentation method and a Canny edge detection method and the first location of the edge is detected by applying a density-based spatial blustering of applications with noise clustering followed by a convex haul algorithm to the aggregated depth point cloud.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
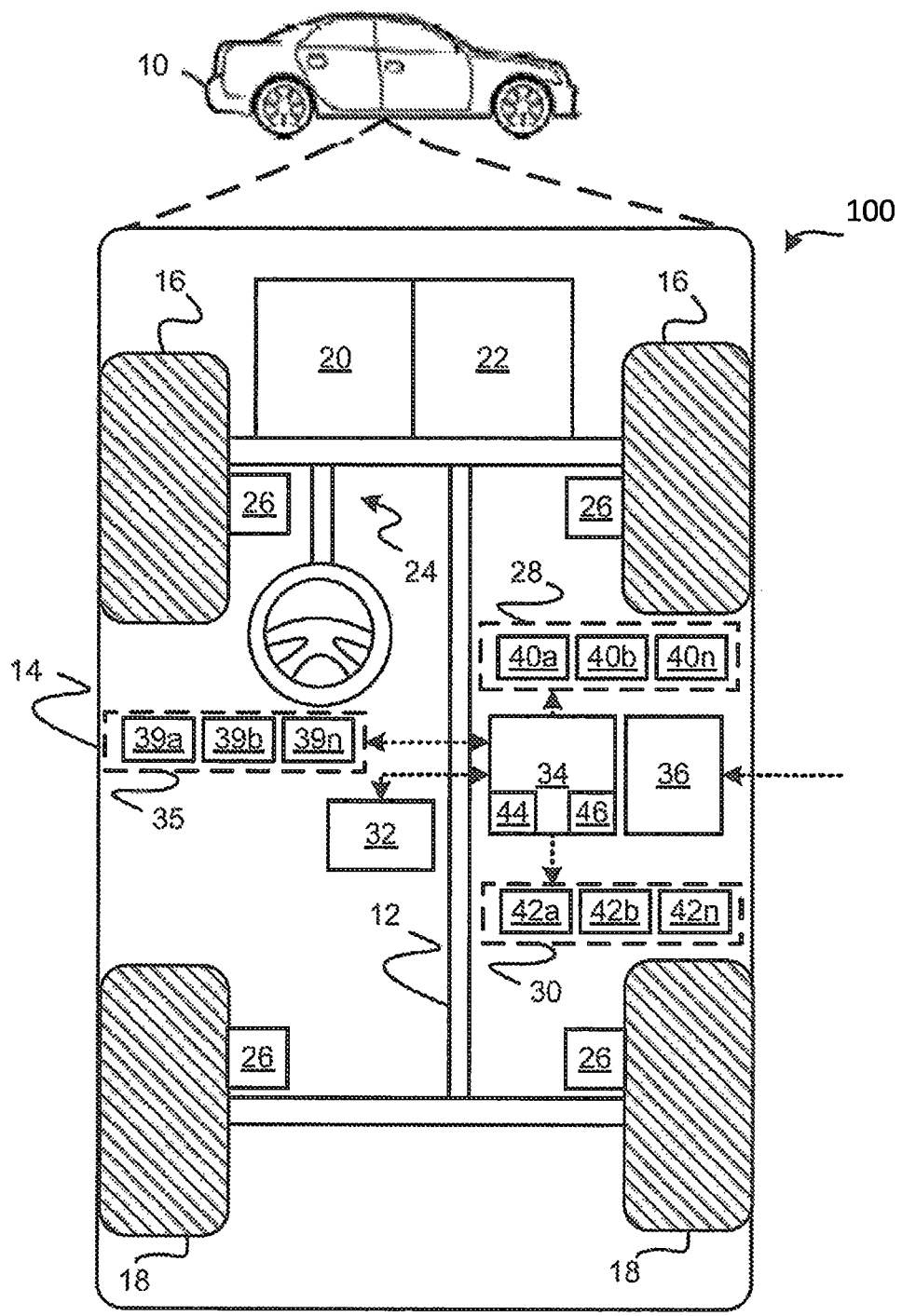
FIG. 1 shows a functional block diagram of an exemplary system for extrinsic calibration of lidar and long-range cameras using stop behind vehicle (SBV) triggers is shown in accordance with various embodiments.

Turning now to FIG. 1, an exemplary system 100 for extrinsic calibration of lidar and long-range cameras using stop behind vehicle (SBV) triggers is shown in accordance with various embodiments. The exemplary system 100 includes vehicle 10 having a plurality of sensing devices 40a-40n, a propulsion system 20, a transmission system 22, a steering system 24, a brake system 26, a sensor system 28, an actuator system 30, at least one data storage device 32, at least one controller 34, and a communication system 36.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the vehicle may be a non-autonomous vehicle and is not limited to the present examples.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors.

In various embodiments, the sensing devices 40a-40n are disposed at different locations of the vehicle 10. In exemplary embodiments described herein, one or more of the sensing devices 40-40n are realized as lidar devices. In this regard, each of the sensing devices 40a-40n may include or incorporate one or more lasers, scanning components, optical arrangements, photodetectors, and other components suitably configured to horizontally and rotatably scan the environment in the vicinity of the vehicle 10 with a particular angular frequency or rotational velocity. In exemplary embodiments described herein, one or more of the sensing devices 40a-40n are realized as optical cameras configured to capture images of the environment in the vicinity of the vehicle 10.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
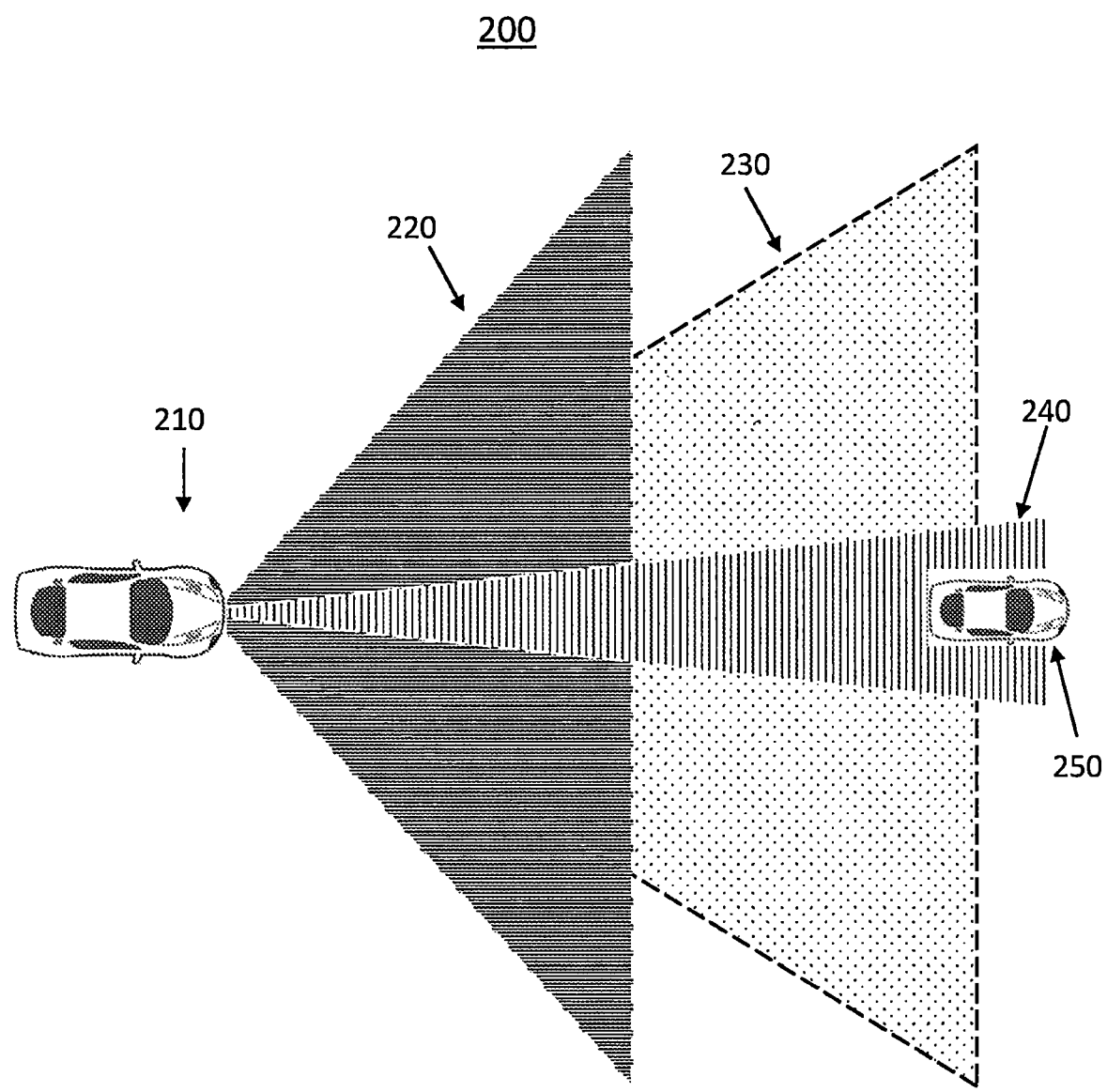
FIG. 2 shows an exemplary environment for extrinsic calibration of lidar and long-range cameras using stop behind vehicle (SBV) triggers is shown in accordance with various embodiments.

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. In various embodiments, the data storage device 32 stores calibrations for use in aligning the sensing devices 40a-40n. In various embodiments, one or more of the calibrations are estimated as extrinsic parameter using the methods and systems described herein. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In various embodiments, one or more instructions of the controller 34 are embodied in the control system 100 and, when executed by the processor 44, cause the processor 44 to perform the methods and systems that dynamically align the sensor devices by updating calibrations stored in the data storage device 32 as described in greater detail below.

In accordance with various embodiments, the controller 34 implements an autonomous driving system (ADS). Software and/or hardware components of the controller 34 (e.g., processor 44 and computer-readable storage device 46) are utilized to provide an autonomous driving system that is used in conjunction with vehicle 10, for example, to automatically control various actuators 30 onboard the vehicle 10 to thereby control vehicle acceleration, steering, and braking, respectively, without human intervention.

In various embodiments, the instructions of the autonomous driving system 70 may be organized by function or system. For example, the autonomous driving system can include a computer vision system, a positioning system, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. In various embodiments, the computer vision system 74 receives information from and/or implements the control system 100 described herein.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Turning now to FIG. 2, an exemplary environment 200 for extrinsic calibration of lidar and long-range cameras using SBV triggers is shown in accordance with various embodiments. The exemplary environment 200 includes a vehicle 210 having a short range camera field of view (FOV) 220, a Lidar FOV 230, a long range camera FOV 240, and a proximate vehicle 250.

Problems arise when trying to perform sensor data fusion between lidar and camera images captured with a long range camera FOV 240 with a lidar point cloud determined over the lidar FOV 230 as there will typically be relatively few points of the lidar point cloud within the long range camera FOV 240. For example, if a lidar detects a depth every 0.1 degrees, the detected points will be increasingly spaced out as the distance to the detected object increases. In the exemplary embodiment shown, the proximate vehicle 250 may only be detected by few of the lidar depth points, thereby making it difficult to determine a location of edges of the proximate vehicle 250 which are used to align the image of the long range camera FOV 240.

Traditional dynamic Lidar-to-Camera alignment algorithms typically utilize data pairs, such as camera frames and 3D LiDAR point clouds, to perform the alignment in a sequential iterative fashion The currently disclosed system teaches a lightweight and accurate algorithm to calibrate Lidar-to-Camera extrinsic parameters. With reference now to FIG. 1, a control system shown generally at 100 is associated with a vehicle 10 in accordance with various embodiments. In general, the control system 100 selectively aligns two sensors of the vehicle 10 by estimating extrinsic parameters. As will be discussed in more detail, the estimating is based on a method that iteratively aligns points from data sets generated by the two sensors. In various embodiments, the two sensors include a lidar sensor and a camera sensor. As can be appreciated, other sensors can be implemented in various embodiments.

Figure 3:
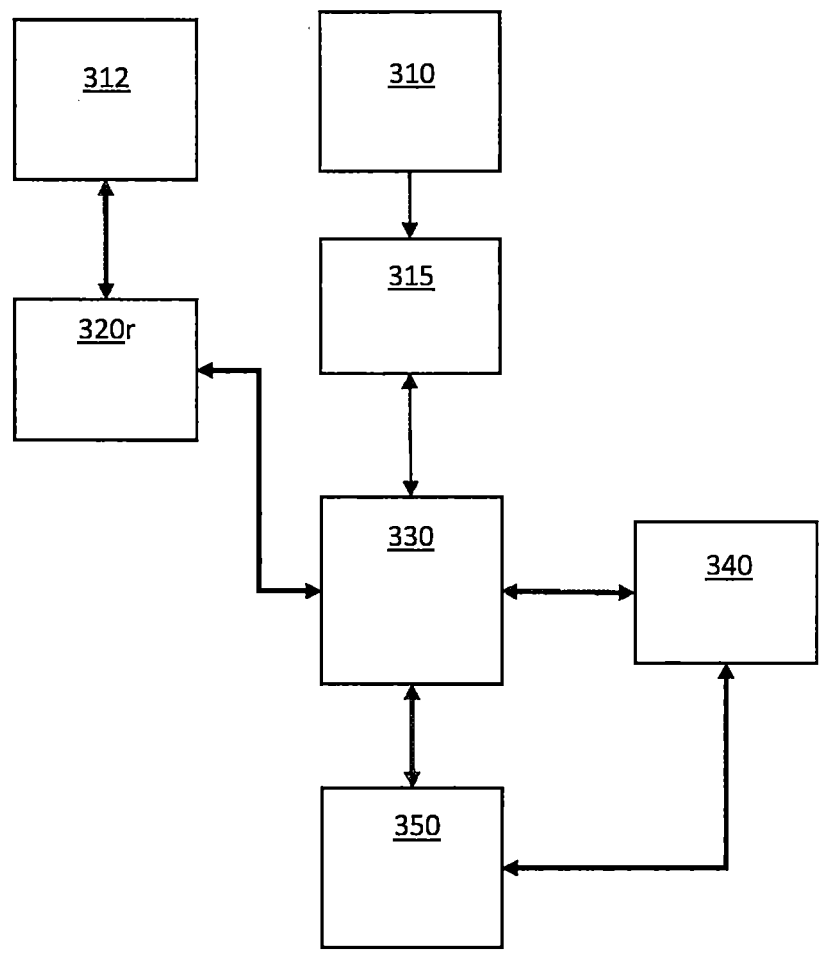
FIG. 3 shows an exemplary block diagram for a system for extrinsic calibration of lidar and long-range cameras using SBV triggers is shown in accordance with various embodiments.

Turning now to FIG. 3, an exemplary block diagram for a system 300 for extrinsic calibration of lidar and long-range cameras using SBV triggers is shown in accordance with various embodiments. The exemplary system 300 includes a lidar 312, lidar processor 320, a camera 310, an image processor 315, a sensor system processor 330, a memory 340, and a vehicle controller 350.

The lidar 312 is configured to transmit a light pulse at a known angle and elevation and detect the time of propagation of the light pulse. The lidar 312 can then determine a distance to an object at the known angle and elevation in response to the time of propagation. The lidar 312 can repeat this operation for a plurality of angles and elevations to generate a point cloud of depths to objects within the lidar FOV. Typically, the light pulses are transmitted at regular angle intervals, such as 0.1 degrees and at regular elevation intervals. The larger the number of detection points aggregated in the point cloud, the longer it takes the lidar to complete the scan of the lidar FOV. A lidar point cloud with high density of 3D points requires longer intervals of data capture, but provides higher resolution data with rich features to be utilize in the alignment.

In some exemplary embodiments, the lidar 312 can be configured to couple the detected depths for each of the angles and elevations as individual points or as a point cloud to the lidar processor 320. The lidar processor 320 may generate a 3D contour of target vehicles in response to the points and/or point cloud. In addition, the lidar processor 320 may generate a 3 dimensional representation of the field of view including detection and classification of objects within the field of view.

The camera 310 may be a long range camera 310 having a narrow FOV. Typically, the long range camera 310 is used for traffic sign recognition, video-based distance control, road guidance, forward object detection and the like. The long range camera 310 can capture a high definition image which is then coupled to the image processor 315 for object detection. The image processor 315 may run image processing algorithms in response to the image, such as Canny edge detection algorithms for detecting edges within the image as well as RCNN segmentation to detect vehicle contours. These detected edges can them be used to detect object outlines. These object outlines can be used to set boundaries around the detected object as well as to identify and classify the detected objects.

In some exemplary embodiments, the sensor system processor 330, or comparable processor or system for processing sensor data, can receive the two dimensional edge detected image data from the image processor 315 and the three dimensional point cloud from the lidar processor 320. This data can then be used to calibrate the alignment of the sensors such that, for example, detected objects are determined to be in the same location for each of the sensors. In addition, further processing may be performed to fuse the sensor data and perform other vehicle algorithms in response to the fused data. This fused data can be used to compensate for weaknesses in each of the individual data types.

Problems can arise in aligning data from long range sensors and shorter range sensors, such as lidar, as long range sensors will only capture a small portion of the field of view of the shorter range sensors. For a lidar sensor, a long range camera may only capture a small number of depth measurements of the lidar, making fusion between the lidar point cloud and the long range image difficult using conventional methods. The sparsity of lidar points within the narrow FOV region, making it hard to extract useful calibration features from LiDAR sensor. In addition, a lack of objects in the camera FOV, reducing the possibility of finding targets in the streamed frames. Sensitivity of extrinsic rotational alignment increases due to the narrow overlapping region. In particular, roll rotation alignment (rotation around the forward direction axis) is highly sensitive compared to using cameras with wide FOV. To address these problem, the sensor system processor 330 can use SBV triggers and associated algorithm to improve long range camera calibration.

For calibrating the long range camera 310, the sensor system processor 330 is first configured to detect an SBV occurrence in response to the lidar point cloud. An SBV trigger can occur in response to detection of a stationary object, such as another vehicle, being detected within the field of view of the long range camera 310 and the lidar 312 and at less than a threshold distance while the host vehicle is also stationary. In some exemplary embodiments the threshold distance can be 10 meters. When both the detected object and the host vehicle are stationary, multiple scans of the object by the lidar 312 can be performed quickly, thereby generating more depth points in the lidar point cloud for use in correlating edges detected in the image from the long range camera 310. In some exemplary embodiments, the SBV occurrence may be triggered when a distance between the object and the host vehicle is stabilized. This may occur, for example, during an adaptive cruise control operation where the most vehicle maintains a consistent distance from a preceding vehicle and wherein the relative position of the preceding vehicle may not change with respect to the host vehicle for one second or more.

In some exemplary embodiments, after the sensor system processor 330 has detected the host vehicle is in a stopped or non-moving condition, the sensor system processor 300 attempts to determine if a suitable SBV condition exists. The sensor system processor 330 is configured to perform an algorithm to collect data from the lidar processor 320 and the image processor 315. The algorithm first searches the data for an object within the threshold distance. If an object is detected within the threshold distance, the algorithm next determines if the object is moving. If the object is moving, a suitable SBV condition does not exist and the algorithm attempts to detect a stationary object within the threshold distance.

In some exemplary embodiments, the SBV condition detection includes collecting synchronized Lidar data and camera images while behind a leading vehicle. While driving, the lidar three-dimensional point cloud is temporally generated to estimate the distance of the returned points within the lidar FOV. If an object is detected in front of a vehicle in response to the point cloud within a threshold distance, such as 10 meters, the algorithm begins to track the distance changes over various time stamps. Once the detected distance stabilizes, an SBV trigger condition is confirmed.

In response to the SBV trigger confirmed condition, an image is captured using the camera and one second of lidar data is captured. In some exemplary embodiments, one second of lidar point data corresponds to 20 lidar frame scans wherein each lidar frame scan takes 50 ms. The one second of lidar data is aggregated in a single lidar point cloud to generate an aggregated three dimensional lidar data. The algorithm is next operative to preprocess the lidar data by performing a Density-Based Spatial Clustering of Applications with Noise (DBSCAN) which is a base algorithm for density-based clustering. The DBSCAN is used to detect clusters of different shapes and sizes from a large amount of data, which is containing noise and outliers. The exemplary algorithm may next perform a convex hull algorithm where the convex hull, or convex envelope, defines a shape that is contained by the set of convex points containing the shape. The image data is preprocessed by the algorithm by performing an inverse distance transform (IDT) on the image captured by the long range camera A distance transform provides a metric or measure of the separation of points in the image. An IDT reconstructs a 2D map from its distance transform.

After the preprocessing of the image and lidar data, the sensor system processor 330 performs an interactive joint algorithm and searches through a group of three degree of freedom (DOF) perturbations. If a low alignment score is achieved, the iterative joint algorithm is reperformed. The proposed SBV triggering algorithm can be considered as a 2-Phase Lidar to Camera alignment algorithm, consisting of a very light weight candidate selection algorithm searching for SBV scenarios only. A lightweight algorithm is an algorithm that features a small memory footprint and/or low computational complexity. In some exemplary embodiments, aggregating the alignment data from three different SBV targets can be sufficient to achieve sufficiently acceptable alignment results.

The alignment results can be used to correct the lidar point cloud and/or the object detection data determined from the images which can then be stored in the memory 240. The memory 340 can be used to store the corrected image and lidar data and/or can be used to store a three-dimensional representation of the space proximate to the host vehicle. This stored data can then be accessed by the vehicle controller 350 for control of the vehicle according to an advanced assisted driving algorithm, such as a lane centering operation, adaptive cruise control, or full autonomous vehicle operation.

Figure 4:
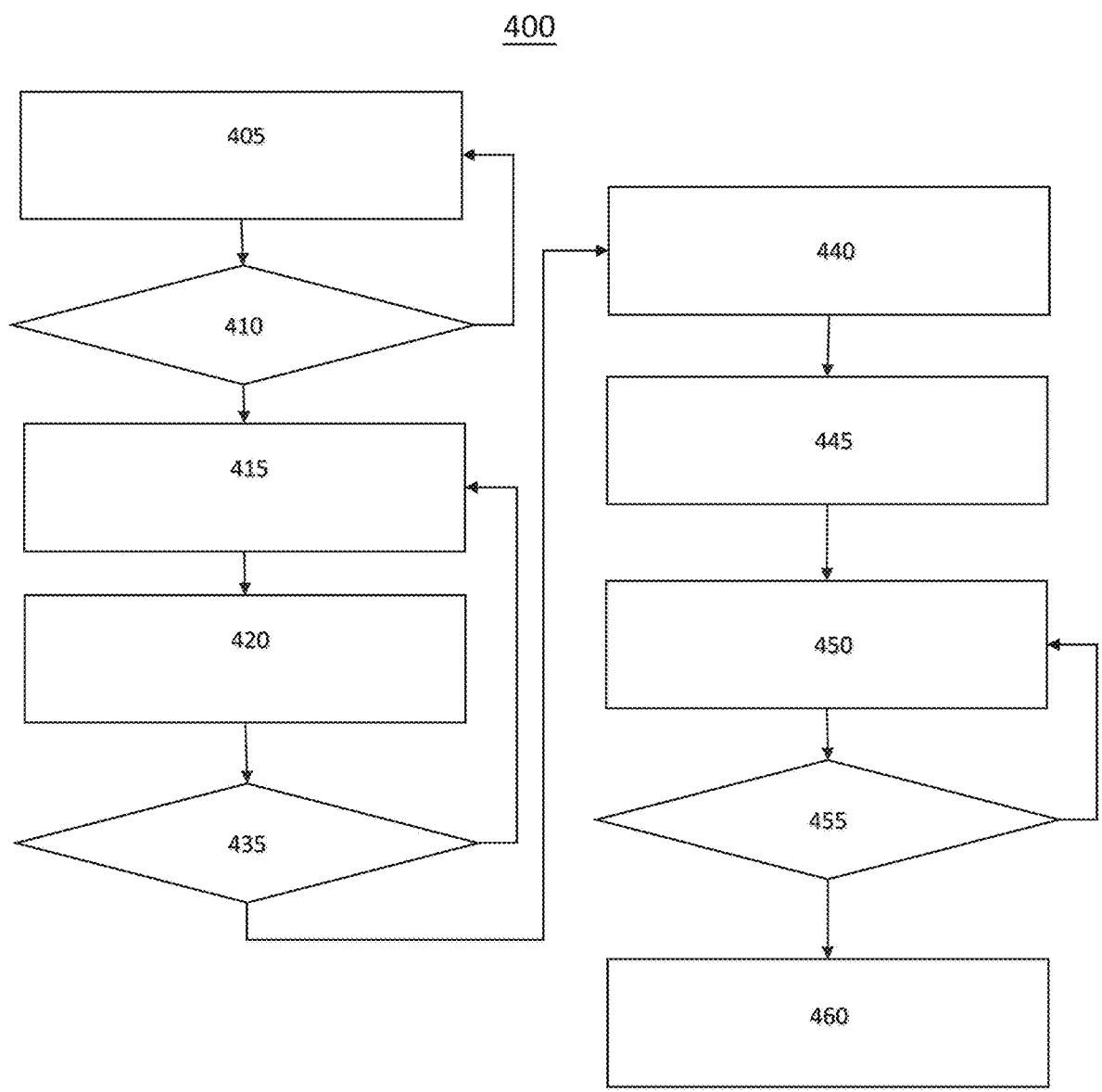
FIG. 4 shows a flowchart illustrating a method for extrinsic calibration of lidar and long-range cameras using SBV triggers is shown in accordance with various embodiments.

Turning now to FIG. 4, a flow chart illustrating an exemplary implementation of a method 400 for extrinsic calibration of lidar and long-range cameras using SBV triggers is shown in accordance with various embodiments is shown. While the following method is described as a series of sequential steps, some of the steps may be performed in parallel or non-sequentially. The following SBV triggering algorithm can be considered as a 2-Phase Lidar to Camera alignment algorithm, consisting of a very light weight candidate selection algorithm searching for SBV scenarios only. In some exemplary embodiments, the method can be first initiated in response to vehicle system initiation. In other exemplary embodiments, the long range camera images can be calibrated in response to a calibration time interval or can be initiated in response to a detected error, divergence or disagreement in location data between the various sensors. A sensor system processor or other sensor fusion processor is configured to first determine if a suitable SBV condition exists. In some exemplary embodiments, the SBV condition detection includes collection of synchronized Lidar data and camera images while driving on the road.

The method is first operative to detect a host 405 vehicle velocity. The calibration of lidar and long-range cameras using SBV trigger condition, is best operative when both the host vehicle and the target object are stationary. The host vehicle velocity can be detected by the sensor system processor in response to data, such as vehicle speed, from the vehicle controller and/or data from a global positioning system or the like. If the host vehicle is not determined 410 to be stationary, the method returns to detecting the host vehicle speed after a time interval or other method initiation condition.

If the host vehicle is determined 410 to be stationary, the method is next configured to collect data from the lidar processor. The lidar data is searched to detect an object and to determine an object distance. This distance is compared with a threshold distance, such as within 10 meters or the like. If an object is detected in front of a vehicle in response to the point cloud within a threshold distance, the algorithm begins to track 420 the distance changes over various time stamps to determine the object velocity and to confirm the object distance. If the object is moving, a suitable SBV condition 435 does not exist and the algorithm attempts to detect another object in response to the lidar data.

If the velocity of the object is stationary, the SBV condition is confirmed. In some exemplary embodiments, the distance to the object is continuously monitored in response to the lidar data. Once the detected distance stabilizes, the object can be determined to be stationary if the host vehicle velocity is stationary and the SBV condition is confirmed. In response to the SBV confirmed condition, numerous scans of lidar data are collected and aggregated. In some exemplary embodiments, an scan of a lidar system FOV takes 50 ms. If 1 second of lidar data is captured, this would correlate to 20 complete lidar scans. The 1 second of lidar data is aggregated in a single lidar point cloud to generate a three dimensional lidar data. The algorithm is next operative to preprocess the lidar data by performing 440 a DBSCAN which is a base algorithm for density-based clustering. The DBSCAN is used to detect clusters of different shapes and sizes from a large amount of data, which is containing noise and outliers. The exemplary algorithm may next perform a convex hull algorithm where the convex hull, or convex envelope, defines a shape that is contained by the set of convex points containing the shape. The image data is preprocessed by algorithm by performing 445 an IDT on the image captured by the long range camera The method is next operative to perform 450 an interactive joint algorithm and searches through a group of three degree of freedom (DOF) perturbations to perform an alignment of the lidar and camera data. An alignment score between the lidar data and the camera data is next determined in response to the results of the interactive joint algorithm. If a low alignment score is achieved 455, the iterative joint algorithm is reperformed. If a confidence score greater than a threshold score is achieved 455 the method stores 460 the estimated alignment parameters in a memory or the like. In some exemplary embodiments, aggregating the alignment data from three different SBV targets can be sufficient to achieve acceptable alignment results.

The alignment results stored in the memory or coupled directly to a vehicle controller or the like, can be used to correct the lidar point cloud and/or the object detection data determined from the images which can then be stored in the memory 340. The memory 340 can be used to store the corrected image and lidar point cloud data and/or can be used to store a three-dimensional representation of the space proximate to the host vehicle. The memory 340 can be used to store calibration or correction factors generated from the alignment algorithm for alignment of the various vehicle sensors. This stored data can then be accessed by the vehicle controller 350 for control of the vehicle according to an advanced assisted driving algorithm, such as a lane centering operation, adaptive cruise control, or full autonomous vehicle operation.

Figure 5A:
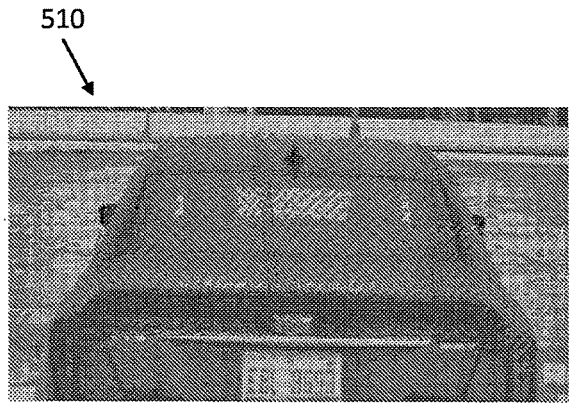
FIGS. 5a, 5b, 5c and 5d show a plurality of images representative of preprocessing lidar and image data for extrinsic calibration of lidar and long-range cameras using SBV triggers is shown in accordance with various embodiments.
Figure 5B:
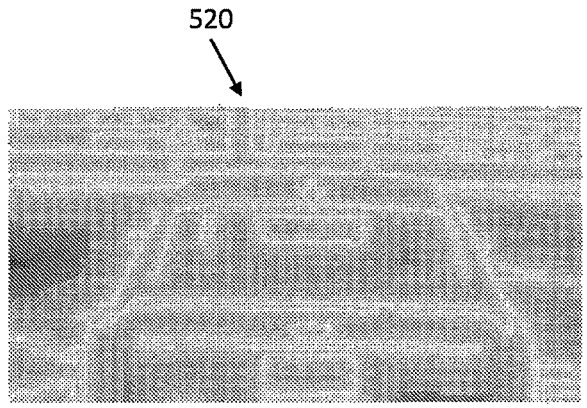
Figure 5C:
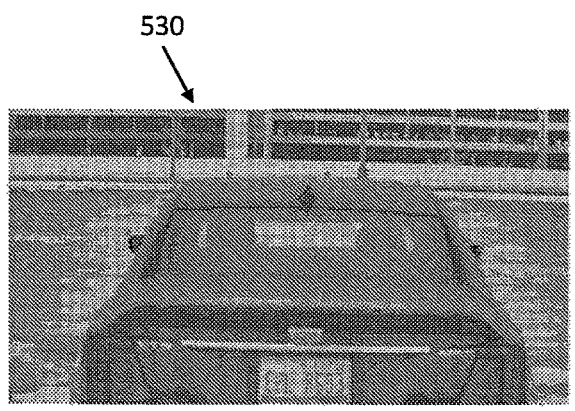
Figure 5D:
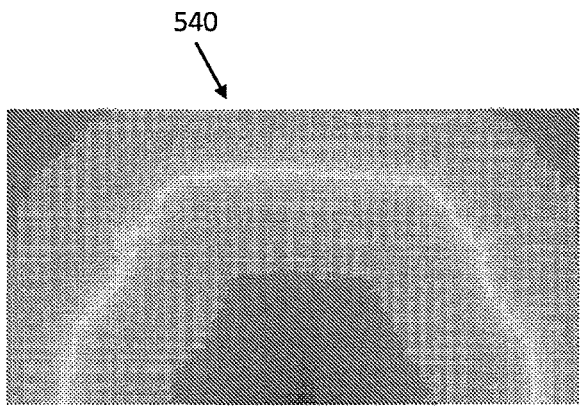

Turning now to FIGS. 5*a*, 5*b*, 5*c* and 5*d*, a plurality of images representative of preprocessing lidar and image data for extrinsic calibration of lidar and long-range cameras using SBV triggers is shown in accordance with various embodiments. The images illustrate preprocessing examples for both lidar and camera sensors after completing the SBV data collection. FIG. 5*a* is illustrative of a lidar point cloud overlaid on a 2 D input image 510 of a vehicle in an SBV condition. FIG. 5*c* is illustrative of lidar contour estimation in response to the point cloud overlaid on an input image 530. The depth cloud is generated in response to aggregated 3D LiDAR data and application of the DBScan clustering followed by a convex haul algorithm. FIG. 5*b* is illustrative the results 520 of a Canny based IDT of the image. FIG. 5*d* is illustrative of RCNN-based IDT of the image. The IDT is computed for a single narrow view, long range camera image.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A sensor system in a host vehicle comprising:
a lidar sensor having a first field of view for generating a point cloud representative of a plurality of depth detections over the first field of view;
a camera having a second field of view for generating an image of the second field of view;
a processor for detecting an object within the first field of view and the second field of view;
determining a distance between the object and the host vehicle and a velocity of the object;
detecting a stationary behind vehicle trigger condition in response to the object being within the first field of view and the second field of view, the object being stationary, the host vehicle being stationary, and the distance between the object and the host vehicle being less than a threshold distance;

detecting a plurality of depth point clouds of the first field of view in response to the stationary behind vehicle trigger condition;

aggregating the plurality of depth point clouds into an aggregated depth point cloud;

preprocessing the aggregated depth point cloud using a density-based spatial clustering algorithm to identify a plurality of point clusters and a convex hull algorithm to define a contour of the object;

preprocessing the image of the second field of view by performing an inverse distance transform to generate a two-dimensional map of the object;

performing an iterative joint algorithm to align the aggregated depth point cloud and the image of the second field of view in response to the contour of the object and the two dimensional map of the object, wherein the algorithm searches through a group of three-degree-of-freedom perturbations;

determining an alignment score in response to an alignment of the aggregated depth point cloud and the image of the second field of view; and storing an estimated extrinsic alignment parameter in a memory if the alignment score exceeds a predetermined confidence threshold; and a vehicle controller for controlling the host vehicle in response to the estimated extrinsic alignment parameter and a subsequent image captured by the camera.

2. The apparatus of claim 1 wherein the second field of view is narrower than the first field of view.

3. The apparatus of claim 1 wherein the camera is a long range camera and wherein the second field of view is narrower than the first field of view.

4. The apparatus of claim 1 further comprising detecting a subsequent object with in the first field of view and the second field of view, detecting a subsequent plurality of depth point clouds of the first field of view in response to the subsequent object being stationary, the host vehicle being stationary, and the distance between the subsequent object and the host vehicle being less than a threshold distance and refining the lidar to camera alignment in response to the subsequent plurality of depth point clouds.

5. The apparatus of claim 1 wherein the threshold distance is 10 meters.

6. The apparatus of claim 1 wherein the object is a proximate vehicle in front of the host vehicle.

7. The apparatus of claim 1 wherein the stationary behind vehicle trigger condition is detected using a stationary behind vehicle triggering algorithm including a 2-Phase Lidar to Camera alignment algorithm having a very light weight candidate selection algorithm searching for at least one of a plurality of stationary behind vehicle scenarios.

8. The apparatus of claim 1 wherein the second location of the edge of the object is detected using at least one of an RCNN vehicle segmentation method and a Canny edge detection method.

9. The apparatus of claim 1 wherein the first location of the edge is detected by applying a density-based spatial clustering of applications with noise clustering followed by a convex haul algorithm to the aggregated depth point cloud.

10. A method for controlling a sensor system in a host vehicle comprising:

detecting, by a lidar, a depth point cloud of a first field of view;

capturing, by a camera, an image of a second field of view;

detecting, by a vehicle controller, a speed of a host vehicle;

detecting an object within the first field of view and the second field of view;

determining a distance between the object and the host vehicle and a velocity of the object;

detecting a stationary behind vehicle trigger condition in response to the object being within the first field of view and the second field of view, the object being stationary, the host vehicle being stationary, and the distance between the object and the host vehicle being less than a threshold distance;

detecting a plurality of depth point clouds of the first field of view in response to the stationary behind vehicle trigger condition;

aggregating the plurality of depth point clouds into an aggregated depth point cloud;

preprocessing the aggregated depth point cloud using a density-based spatial clustering algorithm to identify a plurality of point clusters and a convex hull algorithm to define a contour of the object;

preprocessing the image of the second field of view by performing an inverse distance transform to generate a two-dimensional map of the object;

performing an iterative joint algorithm to align the aggregated depth point cloud and the image of the second field of view in response to the contour of the object and the two dimensional map of the object, wherein the algorithm searches through a group of three-degree-of-freedom perturbations;

determining an alignment score in response to an alignment of the aggregated depth point cloud and the image of the second field of view; and storing an estimated extrinsic alignment parameter in a memory if the alignment score exceeds a predetermined confidence threshold; and controlling a vehicle in response to the estimated extrinsic alignment parameter and a subsequent image captured by the camera.

11. The method of claim 10 wherein the second field of view is narrower than the first field of view.

12. The method of claim 10 wherein the camera is a forward view long range camera having a horizontal field of view less than thirty degrees.

13. The method of claim 10 wherein the threshold distance is ten meters.

14. The method of claim 10 wherein the object is a proximate vehicle in front of the host vehicle.

15. The method of claim 10 wherein the object is determined to be stationary with respect to the host vehicle.

16. The method of claim 10 wherein the stationary behind vehicle trigger condition is detected using a stationary behind vehicle triggering algorithm including a 2-Phase Lidar to Camera alignment algorithm having a very light weight candidate selection algorithm searching for at least one of a plurality of stationary behind vehicle scenarios.

17. The method of claim 10 wherein the second location of the edge of the object is detected using a Canny edge detection method.

18. The method of claim 10 wherein the first location of the edge is detected by applying a density-based spatial blustering of applications with noise clustering followed by a convex haul algorithm to the aggregated depth point cloud.

19. A vehicle control system comprising:

a lidar sensor having a first field of view for generating a point cloud representative of a plurality of depth detections over the first field of view;

a camera having a second field of view for generating an image of the second field of view, the processor configured for:

a processor for detecting an object in response to the point cloud within the first field of view and the second field of view;

determining a distance between the object and the host vehicle and a velocity of the object;

detecting a stationary behind vehicle trigger condition in response to the object being within the first field of view and the second field of view, the object being stationary, the host vehicle being stationary, and the distance between the object and the host vehicle being less than a threshold distance;

detecting a plurality of depth point clouds of the first field of view in response to the stationary behind vehicle trigger condition;

aggregating the plurality of depth point clouds into an aggregated depth point cloud;

preprocessing the aggregated depth point cloud using a density-based spatial clustering algorithm to identify a plurality of point clusters and a convex hull algorithm to define a contour of the object;

preprocessing the image of the second field of view by performing an inverse distance transform to generate a two-dimensional map of the object;

performing an iterative joint algorithm to align the aggregated depth point cloud and the image of the second field of view in response to the contour of the object and the two dimensional map of the object, wherein the algorithm searches through a group of three-degree-of-freedom perturbations;

determining an alignment score in response to an alignment of the aggregated depth point cloud and the image of the second field of view; and storing an estimated extrinsic alignment parameter in a memory if the alignment score exceeds a predetermined confidence threshold;

a vehicle controller for controlling the host vehicle in response to the estimated extrinsic alignment parameter and a subsequent image captured by the camera.

20. The vehicle control system of claim 19 wherein the second location of the edge of the object is detected using a Canny edge detection method and the first location of the edge is detected by applying a density-based spatial blustering of applications with noise clustering followed by a convex haul algorithm to the aggregated depth point cloud.

* * * * *